(12) United States Patent
Park et al.

(10) Patent No.: US 12,126,197 B2
(45) Date of Patent: Oct. 22, 2024

(54) DEVICE FOR SUPPLYING POWER FROM VEHICLE BATTERY TO VEHICLE OUTSIDE AND VEHICLE BIDIRECTIONAL CHARGER INCLUDING SAME

(71) Applicants: Hyundai Motor Company, Seoul (KR); Kia Corporation, Seoul (KR)

(72) Inventors: Sung Uk Park, Busan (KR); Hyun Wook Seong, Gyeonggi-do (KR); Dong Gyun Woo, Gyeonggi-Do (KR); Chul Soon Kim, Gyeonggi-do (KR); Hui Sung Jang, Gyeonggi-do (KR); Jee Heon Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 506 days.

(21) Appl. No.: 17/473,333

(22) Filed: Sep. 13, 2021

(65) Prior Publication Data

US 2022/0209552 A1    Jun. 30, 2022

(30) Foreign Application Priority Data

Dec. 24, 2020  (KR) .................. 10-2020-0183442

(51) Int. Cl.
*H02J 7/00* (2006.01)
*B60L 53/60* (2019.01)
*B60L 55/00* (2019.01)

(52) U.S. Cl.
CPC ............ *H02J 7/0029* (2013.01); *B60L 53/60* (2019.02); *B60L 55/00* (2019.02); *H02J 7/0063* (2013.01); *H02J 7/0068* (2013.01)

(58) Field of Classification Search
CPC ...... B60L 55/00; B60L 53/60; B60L 2210/00; H02J 2207/20; H02J 2207/40; H02J 7/02; H02J 3/322
See application file for complete search history.

(56) References Cited

U.S. PATENT DOCUMENTS

| | | | | |
|---|---|---|---|---|
| 8,698,354 B2* | 4/2014 | Ghosh | .................... | H02J 9/062 307/66 |
| 11,070,147 B2* | 7/2021 | Takemoto | ......... | H02M 7/53878 |
| 2022/0063423 A1* | 3/2022 | Rodionov | ............... | B60L 50/53 |

FOREIGN PATENT DOCUMENTS

| KR | 2016-0057524 A | 5/2016 |
|---|---|---|
| KR | 2018-0078779 A | 7/2018 |

* cited by examiner

*Primary Examiner* — Richard Isla
*Assistant Examiner* — Sadia Kousar
(74) *Attorney, Agent, or Firm* — Fox Rothschild LLP

(57) ABSTRACT

A device for supplying power from a vehicle battery to the outside is provided. The device includes an inverter circuit having a bridge circuit with multiple switching elements and that converts the received DC power into the AC power by switching the switching elements and that outputs the AC power. A controller controls an on/off state of each switching element through pulse width modulation. When an output AC output to the load has a value greater than a preset reference value or an input direct current input into the inverter has a value greater than a preset reference value, the controller changes a duty of each switching element to reduce an output AC voltage output from the inverter. When the reduced output AC voltage has a value equal to or less than a preset reference value, the controller stops a power conversion operation of the inverter.

18 Claims, 8 Drawing Sheets

DEVICE FOR SUPPLYING POWER FROM VEHICLE BATTERY TO VEHICLE OUTSIDE AND VEHICLE BIDIRECTIONAL CHARGER INCLUDING SAME

CROSS REFERENCE TO RELATED APPLICATION

The present application claims priority to Korean Patent Application No. 10-2020-0183442, filed Dec. 24, 2020, the entire contents of which is incorporated herein for all purposes by this reference.

BACKGROUND

1. Field of the Disclosure

The present disclosure relates to a device for supplying power from a vehicle battery to a vehicle outside and a vehicle bidirectional charger including the same and, more specifically, to a device for supplying power from a vehicle battery to a vehicle outside and a vehicle bidirectional charger including the same, wherein when power accumulated in a battery inside a vehicle is provided to an outside load, burning of hardware can be prevented while securing robustness of power supply.

2. Description of the Prior Art

In general, a plugin hybrid vehicle or an electric vehicle has a large-capacity battery for storing power required by the motor for driving the vehicle, and may include a charger for converting external power according to the battery voltage and charging the battery thereby. Conventional chargers have a monodirectional power flow such that external power is converted and provided to the battery. However, it has recently been proposed to replace the diode provided in the power-factor correction circuit inside the charger with a switching element capable of conducting on/off control such that the power-factor correction circuit is operated as an inverter, thereby converting battery power into alternating-current power and outputting the same to the outside of the vehicle (so-called vehicle-to-load (V2L) technology).

When power is supplied from a vehicle to which the V2L technology is applied to an outside load, overloading is likely to occur since the power that the vehicle can provide is limited, and the amount of load current is determined by the outside load. Therefore, a vehicle to which the V2L technology is applied is required to have a function for suspending the V2L operation if overloading occurs, to prevent hardware burning in an overloading condition. However, the user of the V2L function may be severely inconvenienced if the V2L operation is suspended even by a slight overshoot occurring during the initial phase of the V2L operation or occurring in the process of load variation, or by a slight surging current due to load characteristics.

The above descriptions regarding background arts are only for helping understanding of the background of the present disclosure, and are not to be considered by a person skilled in the art as corresponding to already-known prior arts.

SUMMARY

Accordingly, it is an aspect of the present disclosure to provide a device for supplying power from a vehicle battery to a vehicle outside and a vehicle bidirectional charger including the same, wherein during a V2L operation of providing power accumulated in a battery inside a vehicle to an outside load, burning of hardware may be prevented while securing robustness of power supply.

In accordance with an aspect of the present disclosure, a device is provided to supply power from a battery in a vehicle to an outside of the vehicle. The device is configured to receive direct current power from the battery in the vehicle, convert the direct current power into alternating current power, and output the alternating current power to a load outside the vehicle. In particular, the device may include: an inverter circuit which includes a bridge circuit including multiple switching elements and is configured to convert the received direct current power into the alternating current power by switching of the switching elements, and output the alternating current power; and a controller configured to control an on/off state of each of the switching elements through pulse width modulation. The controller is configured to: when an output alternating current output to the load has a value greater than a preset reference value or when an input direct current input into the inverter has a value greater than a preset reference value, change a duty of each of the switching elements to reduce an output alternating current voltage output from the inverter; and when the reduced output alternating current voltage has a value equal to or less than a preset reference value, stop a power conversion operation of the inverter.

In an exemplary embodiment of the present disclosure, the controller may include: a voltage controller configured to generate a d-axis current command value for converging an error between a d-axis voltage value of an output alternating current voltage output from the inverter to the load and a preset d-axis voltage command value on zero; a current controller configured to determine a duty of each of the switching elements to converge an error between a d-axis current value of the output alternating current output from the inverter to the load and the d-axis current command value on zero; and a current upper-limit value setting part configured to set an upper limit of the d-axis current command value such that the upper limit of d-axis current command value is reduced when the output alternating current has a value greater than the preset reference value or when the input direct current has a value greater than the preset reference value.

In an exemplary embodiment of the present disclosure, the controller may further include a comparator configured to output a command to stop a power conversion operation of the inverter when the d-axis voltage value of the output alternating current voltage is equal to or less than a preset d-axis voltage lower-limit setting value regarding an output alternating current voltage. In addition, the current upper-limit value setting part may include an output alternating current limitation part configured to generate a first d-axis current upper-limit correction value for converging an error between a limitation value regarding a preset rms value of an output alternating current and a sensing value of the output alternating current on zero, and is configured to determine the upper limit of the d-axis current command value by adding the first d-axis current upper-limit correction value to a d-axis current limitation value derived from the limitation value regarding the preset rms value of the output alternating current.

The d-axis current limitation value may be determined by multiplying the preset rms value of the output alternating current by $\sqrt{2}$. In addition, the output alternating current limitation part may include a limiter configured to limit the first d-axis current upper-limit correction value such that the first d-axis current upper-limit correction value is added to the d-axis current limitation value when the first d-axis current upper-limit correction value is zero or a negative number.

The current upper-limit value setting part may include an input direct current limitation part configured to generate a second d-axis current upper-limit correction value for converging an error between a preset input direct current limitation value and an average value of a sensing value of an input direct current input from the battery to the inverter on zero, and is configured to determine the upper limit of the d-axis current command value by adding the second d-axis current upper-limit correction value to a d-axis current limitation value derived from the limitation value regarding the preset rms value of the output alternating current.

In addition, the d-axis current limitation value may be determined by multiplying the preset rms value of the output alternating current by $\sqrt{2}$. The current upper-limit value setting part may be configured to: divide a preset maximum output of the battery by an average value of the input direct current voltage; and set, to the input direct current limitation value, a smaller value selected from among an input direct current limitation value preset in consideration of a hardware characteristic and a value resulting from the division. The input direct current limitation part may include a limiter configured to limit the second d-axis current upper-limit correction value such that the second d-axis current upper-limit correction value is added to the d-axis current limitation value when the second d-axis current upper-limit correction value is zero or a negative number.

In accordance with an aspect of the present disclosure, a bidirectional charger for a vehicle is provided, which, in a charging mode of a battery in the vehicle, receives alternating current power from outside the vehicle, converts the alternating current power into direct current power, and provides the direct current power as charging power for the battery, and, in a load power provision mode, receives direct current power from the battery, converts the direct current power into alternating current power, and outputs the alternating current power to a load outside the vehicle. The bidirectional charger may include: an inverter-type power-factor correction circuit which includes a bridge circuit including multiple switching elements and is configured to, through switching of the switching elements, convert external alternating current power into direct current power in the charging mode and convert direct current power into alternating current power in the load power provision mode; a bidirectional direct current converter configured to convert a voltage of the direct current power converted by the inverter-type power-factor correction circuit in the charging mode into a charging voltage for the battery, and in the load power provision mode, convert a voltage of the battery and provide the converted voltage of the battery to the inverter-type power-factor correction circuit; and a controller configured to control an on/off state of each of the switching elements through pulse width modulation.

The controller is further configured to: change, in the load power provision mode, a duty of each of the switching elements to reduce an output alternating current voltage output from the inverter when an output alternating current output to the load has a value greater than a preset reference value or when an input direct current input into the inverter has a value greater than a preset reference value; and stop the load power provision mode when the reduced output alternating current voltage has a value equal to or less than a preset reference value.

In an exemplary embodiment of the present disclosure, the controller may include: a voltage controller configured to generate a d-axis current command value for converging an error between a d-axis voltage value of an output alternating current voltage output from the inverter to the load and a preset d-axis voltage command value on zero in the load power provision mode; a current controller configured to determine a duty of each of the switching elements to converge an error between a d-axis current value of the output alternating current output from the inverter to the load and the d-axis current command value on zero in the load power provision mode; and a current upper-limit value setting part configured to set an upper limit of the d-axis current command value such that the upper limit of the d-axis current command value is reduced when the output alternating current has a value greater than the preset reference value or when the input direct current has a value greater than the preset reference value in the load power provision mode.

The controller may further include a comparator configured to output a command to stop a power conversion operation of the inverter when the d-axis voltage value of the output alternating current voltage is equal to or less than a preset d-axis voltage lower-limit setting value regarding an output alternating current voltage in the load power provision mode. In addition, the current upper-limit value setting part may include an output alternating current limitation part configured to generate a first d-axis current upper-limit correction value for converging an error between a limitation value regarding a preset rms value of an output alternating current and a sensing value of the output alternating current on zero in the load power provision mode, and is configured to determine the upper limit of the d-axis current command value by adding the first d-axis current upper-limit correction value to a d-axis current limitation value derived from the limitation value regarding the preset rms value of the output alternating current in the load power provision mode.

The d-axis current limitation value may be determined by multiplying the preset rms value of the output alternating current $\sqrt{2}$. In an exemplary embodiment of the present disclosure, the output alternating current limitation part may include a limiter configured to limit the first d-axis current upper-limit correction value such that the first d-axis current upper-limit correction value is added to the d-axis current limitation value when the first d-axis current upper-limit correction value is zero or a negative number in the load power provision mode.

In addition, the current upper-limit value setting part may include an input direct current limitation part configured to generate a second d-axis current upper-limit correction value for converging an error between a preset input direct current limitation value and an average value of a sensing value of an input direct current input from the battery to the inverter on zero in the load power provision mode, and is configured to determine the upper limit of the d-axis current command value by adding the second d-axis current upper-limit correction value to a d-axis current limitation value derived from the limitation value regarding the preset rms value of the output alternating current in the load power provision mode.

In an exemplary embodiment of the present disclosure, the d-axis current limitation value may be determined by multiplying the preset rms value of the output alternating current by $\sqrt{2}$. In addition, the current upper-limit value setting part may be configured to: divide a preset maximum output of the battery by an average value of the input direct current voltage in the load power provision mode; and set, to the input direct current limitation value, a smaller value selected from among an input direct current limitation value preset in consideration of a hardware characteristic and a value resulting from the division. In an exemplary embodiment of the present disclosure, the input direct current limitation part may include a limiter configured to limit the second d-axis current upper-limit correction value such that the second d-axis current upper-limit correction value is added to the d-axis current limitation value when the second d-axis current upper-limit correction value is zero or a negative number in the load power provision mode.

The device for supplying power from a vehicle battery to a vehicle outside and a vehicle bidirectional charger including the same are advantageous as follows: power supply is not instantaneously suspended in a temporary overloading situation or the like, but the magnitude of the output alternating-current voltage is gradually reduced, and the power supply is maintained. The power supply is suspended only if the reduced magnitude of the output alternating-current voltage finally becomes equal to/lower than a configured reference. This may prevent user inconveniences caused by power supply suspension in a temporary overloading situation.

In addition, the device for supplying power from a vehicle battery to a vehicle outside and a vehicle bidirectional charger including the same are advantageous in that stable overloading protection may be performed if continuous overloading occurs, regardless of the type of the load supplied with power form the vehicle battery. Since alternating-current power supplied from the vehicle inevitably depends on characteristics of the load, such an overloading protection function against various loads makes it possible to more stably implement the V2L function for supplying power from the vehicle to the load.

Advantageous effects obtainable from the present disclosure are not limited to the above-mentioned advantageous effects, and other advantageous effects not mentioned herein could be clearly understood by a person skilled in the art to which the present disclosure pertains.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
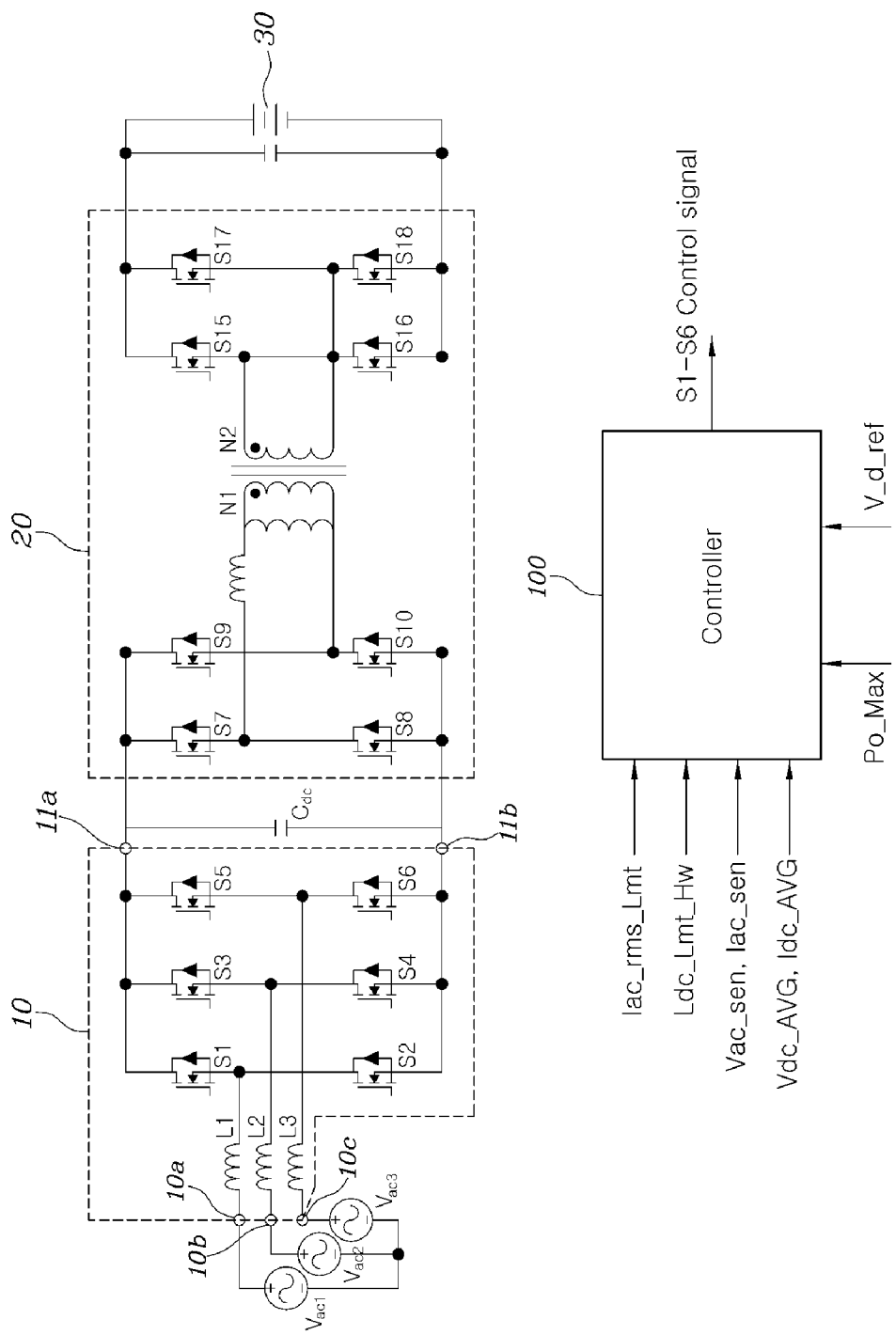
FIG. 1 is a circuit diagram illustrating an example of a bidirectional charger for a vehicle, including a device for supplying power from a battery in the vehicle to the outside of the vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a device for supplying power from a battery in a vehicle to the outside of the vehicle according to various embodiment of the present disclosure will be described in detail with reference to the accompanying drawings.

FIG. 1 is a circuit diagram illustrating an example of a bidirectional charger for a vehicle, including a device for supplying power from a battery in the vehicle to the outside of the vehicle according to an embodiment of the present disclosure. The example illustrated in FIG. 1 is a bidirectional charger provided in a vehicle, and the bidirectional charger is a device for converting direct current power stored in a vehicle battery into three-phase alternating current power and supplying the three-phase alternating current power to the outside of the vehicle, or a device for converting three-phase alternating current power of a grid into direct current power capable of charging a battery and supplying the direct current power to the battery.

As illustrated in FIG. 1, the bidirectional charger, in which a device for supplying power from a battery in the vehicle to the outside of the vehicle according to an embodiment of the present disclosure is implemented, may include: an inverter-type power-factor correction circuit 10 which includes inductors L1 to L3 and a bridge circuit including multiple switching elements S1 to S6; and a bidirectional direct current converter 20 connected between a battery 30 and direct current input/output terminals of the inverter-type power-factor correction circuit 10.

FIG. 1 illustrates an example in which the bidirectional direct current converter 20 is implemented as a topology of an LLC resonant converter for determining the magnitude of a voltage provided to the battery 30 by frequency modulation control of switching elements S7 to S10 therein. However, the bidirectional direct current converter 20 may be replaced with a bidirectional converter of another topology (e.g., a full-bridge phase-shift converter).

When charging the battery 30, grid alternating current voltages $V_{ac1}$, $V_{ac2}$, and $V_{ac3}$, input through alternating current input/output terminals 10a, 10b, and 10c, are converted into direct current by the inverter-type power-factor correction circuit 10, and are then input into the bidirectional direct current converter 20. The bidirectional direct current converter 20 may convert a direct current voltage input from the power-factor correction circuit 10 into a voltage of a magnitude capable of charging the battery 30 through appropriate control. The direct current voltage, the magnitude of which has been converted by the bidirectional direct current converter 20, may be applied to the battery 30, and thus the battery 30 may be charged.

On the other hand, to output power of the battery 30 in the form of an alternating current, the bidirectional direct current converter 20 may be configured to appropriately change the magnitude of the voltage of the battery 30 and provide the changed voltage to the inverter-type power-factor correction circuit 10, and the inverter-type power-factor correction circuit 10, which has received a direct current voltage transferred by the bidirectional direct current converter 20 through direct current input/output terminals 11a and 11b, may be configured to control on/off operation of the switching elements S1 to S6 by applying a normal inverter control algorithm to generate three-phase alternating current power, and may then output the three-phase alternating current power through the alternating current input/output terminals 10a, 10b, and 10c.

The device for supplying power from a battery in a vehicle to the outside of the vehicle according to various embodiments of the present disclosure is a device for appropriately controlling on/off operation of the switching elements S1 to S6, included in the inverter-type power-factor correction circuit 10 of the bidirectional charger, to provide alternating current power to an external load.

Various embodiments of the present disclosure may include a controller 100 configured to operate a switching element in the inverter-type power-factor correction circuit 10. The controller 100 may be configured to receive predetermined setting values of multiple parameters, required to control operation of the device, and sensing values of the multiple parameters, which are actually detected by sensors or the like installed in the device, and may be configured to apply the input setting values and sensing values to a preset algorithm to allow the device to perform an appropriate operation.

The controller 100 included in various embodiments of the present disclosure may be implemented through a non-volatile memory (not shown) configured to store an algorithm configured to control on/off operations of the switching elements S1 to S6, or data related to software instructions to execute the algorithm, and a processor (not shown) configured to perform the operations described below by using the data stored in the memory. The memory and the processor may be implemented in the form of individual chips or a single chip, and one or more processors may be provided.

Figure 2:
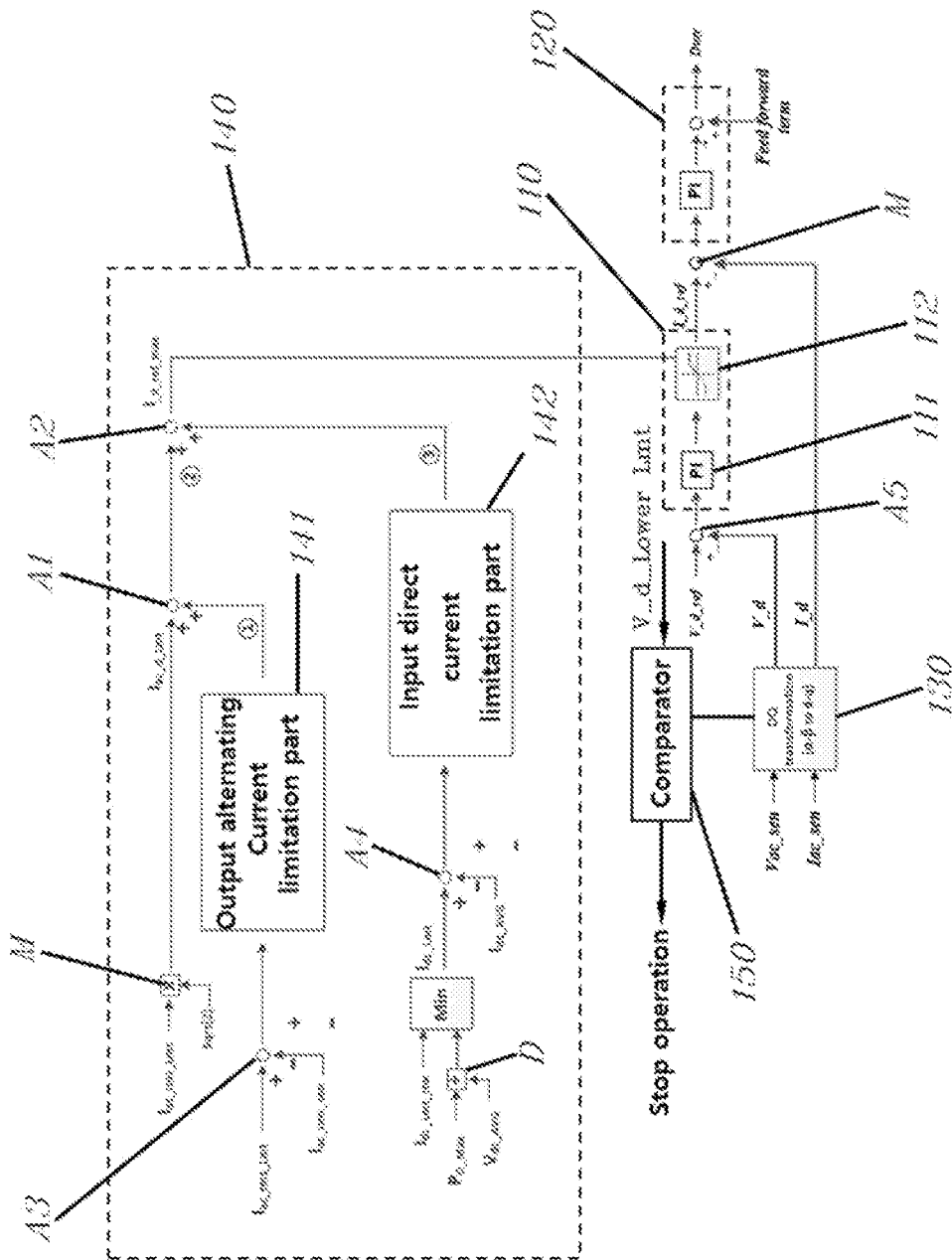
FIG. 2 is a block diagram more specifically illustrating a controller of a device for supplying power from a battery in a vehicle to the outside of the vehicle according to an embodiment of the present disclosure.

FIG. 2 is a block diagram more specifically illustrating a controller of a device for supplying power from a battery in a vehicle to the outside of the vehicle according to an embodiment of the present disclosure.

Referring to FIG. 2, the controller 100 of the device for supplying power from a battery in a vehicle to the outside of the vehicle according to an embodiment of the present disclosure may include: a voltage controller 110 and a current controller 120, configured to operate the switching elements S1-S6 of the inverter-type power-factor correction circuit 10 by performing voltage and current control based on a d-axis voltage (V_d) of an output alternating current voltage sensing value and a d-axis current (I_d) of an output alternating current sensing value, generated by dq-transformation of a sensing value (Vac_sen) of an output alternating current voltage and a sensing value (Iac_sen) of an output alternating current of the device for converting direct current power in the battery into alternating current power and outputting the alternating current power; and a current upper-limit value setting part 140 configured to determine the upper limit of a d-axis current command value (I_d_ref) output from the voltage controller 110. In addition, the controller 100 may further include a comparator 150 configured to output a command to stop operation of the device when a d-axis voltage (V_d) of the output alternating current voltage sensing value becomes less than a preset d-axis voltage lower-limit value (V_d_Lower Lmt).

The voltage controller 110 may be configured to receive an error between the d-axis voltage (V_d) of the output alternating current voltage sensing value and the preset d-axis voltage command value (V_d_ref), and may generate a d-axis current command value (I_d_ref) for converging the error between two values on zero. The voltage controller 110 may be implemented in the form of a proportional-integral controller 111, which is widely known in the corresponding technical field.

Particularly, in an embodiment of the present disclosure, the voltage controller 110 may be configured to receive a current upper-limit value determined by the current upper-limit value setting part 140, and generate and output a d-axis current command value (I_d_ref) that is equal to or less than the current upper-limit value. In other words, the voltage controller 110 may further include a limiter 112 configured to limit an output such that, when a d-axis current command value, generated through proportional-integral control or the like, is greater than the current upper-limit value determined by the current upper-limit value setting part 140, the current upper-limit value is output.

The current controller 120 may be configured to receive an error between the d-axis current command value (I_d_ref) output by the voltage controller 110 and the d-axis current (I_d) of the output alternating current sensing value, and may be configured to generate duty values of the switching elements S1 to S6 for converging the error between two values on zero. The above-described voltage control and current control technique for operating the switching elements S1 to S6 of the bridge circuit included in the inverter circuit is widely known in the corresponding technical field, and thus an additional detailed description thereof will be omitted.

The current upper-limit value setting part 140 may include: an output alternating current limitation part 141 configured to generate a first d-axis current upper-limit correction value (Iac_d_cor1) for converging an error between a preset output alternating current limitation value (Iac_mis_Lmt) and an output alternating current sensing value (Iac_rms_sen) on zero; and an input direct current limitation part 142 configured to generate a second d-axis current upper-limit correction value (Iac_d_cor2) for converging an error between a preset input direct current limitation value (Idc_Lmt) and an average value (Idc_AVG) of an input direct current sensing value on zero. The current upper-limit value setting part 140 may be configured to determine the upper-limit value (I_d_ref_max) of a d-axis current command value (I_d_ref) by applying, to a preset d-axis current limitation value (Iac_d_Lmt) of an output alternating current, the first d-axis current upper-limit correction value (Iac_d_cor1) and second d-axis current upper-limit correction value (Iac_d_cor2), and may provide the upper-limit value (I_d_ref_max) to the voltage controller 110.

In a description of various embodiments of the present disclosure, the wording "output" may refer to output of an alternating current which is provided, to a load, from an inverter circuit (e.g., the inverter-type power-factor correction circuit 10 in FIG. 1) for converting direct current power of the battery 30 into alternating current power, and the wording "input" refers to input of a direct current provided from the battery 30 to an inverter circuit (e.g., the inverter-type power-factor correction circuit 10 in FIG. 1). In other words, the reference of output and input is the inverter circuit for converting power.

The current upper-limit value setting part 140 may be configured to generate the d-axis current limitation value (Iac_d_Lmt) by multiplying the preset output alternating current limitation value (Iac_rms_Lmt) by $\sqrt{2}$ using a multiplier (M).

In general, in inverter control, voltage and current control may be performed by transforming an alternating current voltage and an alternating current into a dq coordinate system. In particular, to perform control such that the phase difference between the alternating current voltage and the alternating current is zero, a q-axis voltage is controlled to be zero by using a dq phase-locked loop, and thus the d-axis value of the alternating current in a normal state is equal to the peak value of the alternating current. Therefore, the d-axis current limitation value (Iac_d_Lmt), which is a d-axis component of the output alternating current limitation value, may be generated by multiplying the output alternating current limitation value (Iac_rms_Lmt), expressed as a root mean square (rms) value, by $\sqrt{2}$.

The current upper-limit value setting part 140 may be configured to perform control of reducing the size of the d-axis current limitation value (Iac_d_Lmt) by applying, to the d-axis current limitation value, the first d-axis current upper-limit correction value (Iac_d_cor1) generated by the output alternating current limitation part 141 and the second d-axis current upper-limit correction value (Iac_d_cor2) generated by the input direct current limitation part 142. The first d-axis current upper-limit correction value (Iac_d_cor1) and the second d-axis current upper-limit correction value (Iac_d_cor2) may be negative values.

In other words, when output reduction is needed due to an increase in the output alternating current sensing value (Iac_rms_sen) or due to an increase in the average value (Idc_AVG) of the input direct current sensing value, the upper limit of a current command value may be reduced by current control, thereby reducing the alternating current output from the device. The adders A1 to A6, the multiplier (M), and the divider (D) illustrated in FIG. 2 are normal elements for simply performing addition, subtraction, and multiplication, and thus a separate detailed description thereof will not be made.

Figure 3:
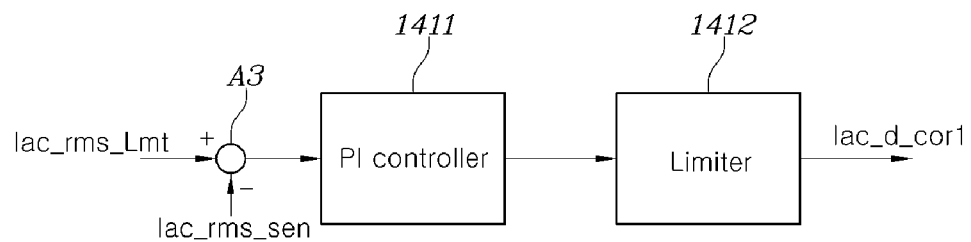
FIG. 3 is a block diagram more specifically illustrating an output alternating current limitation part in a controller of a device for supplying power from a battery in a vehicle to the outside of the vehicle according to an embodiment of the present disclosure.

FIG. 3 is a block diagram more specifically illustrating an output alternating current limitation part in a controller of a device for supplying power from a battery in a vehicle to the outside of the vehicle according to an embodiment of the present disclosure. Referring to FIG. 3, the output alternating current limitation part 141 may include: a PI controller 1411 configured to perform error removal control for converging an error between a preset output alternating current limitation value (Iac_rms_Lmt) and an output alternating current sensing value (Iac_rms_sen) on zero; and a limiter 1412 configured to limit output of the PI controller 1421 such that only negative values are output.

If the output of the voltage controller 110 is limited only by a d-axis current limitation value (Iac_d_Lmt) of alternating current, when a harmonic component is included in an alternating current load current (an output alternating current) or when load impedance includes an inductance or capacitance component, the d-axis component value of the alternating current load current is less than the peak value of the alternating current load current, and thus, even when output current limitation is required, the limitation may not be appropriately performed. The output alternating current limitation part 141 is provided to perform normal output current limitation even in this case.

In the output alternating current limitation part 141, when the rms value (Iac_rms_sen) of a sensed output alternating current is greater than the preset output alternating current limitation value (Iac_rms_Lmt), an error input to the controller 1411 has a negative value, and thus a value output from the controller 1411 is a negative value. The upper-limit value of a current command, output from the voltage controller 110, is reduced by adding the output value from the controller 1411 to the d-axis component (Iac_d_Lmt) of the preset output alternating current limitation value.

The limiter 1412 may be configured to limit an output such that only a negative value is output. In other words, the limiter 1412 may allow the first d-axis current upper-limit correction value (Iac_d_cor1), output by the output alternating current limitation part 141, to be only a negative value. The limiter 1412 may allow, only when the value output by the controller 1411 is a negative value, the value output by the controller 1411 to be added to the preset output alternating current limitation value (Iac_rms_Lmt), and thus may prevent the upper limit of a current command value, output by the voltage controller 110, from being increased and may reduce the current command value.

Accordingly, the output alternating current limitation part 141 may be configured to limit the preset output alternating current limitation value (Iac_rms_Lmt) by using the rms value of an output alternating current. Therefore, even when there is a harmonic component or there is a phase difference between an alternating current and an AC voltage, the output alternating current limitation part 141 may limit the output value of an inverter voltage controller.

Figure 4:
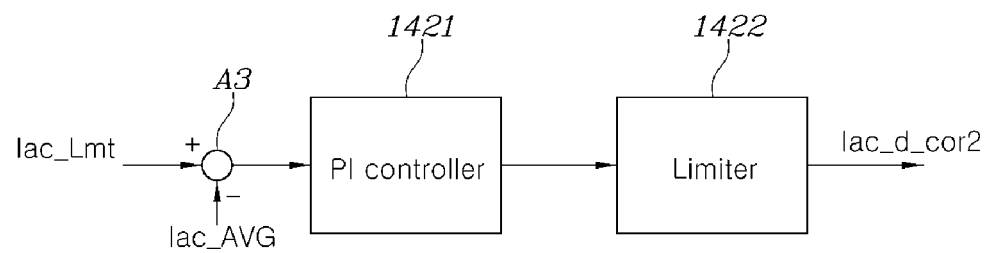
FIG. 4 is a block diagram more specifically illustrating an input direct current limitation part in a controller of a device for supplying power from a battery in a vehicle to the outside of the vehicle according to an embodiment of the present disclosure.

FIG. 4 is a block diagram more specifically illustrating an input direct current limitation part in a controller of a device for supplying power from a battery in a vehicle to the outside of the vehicle according to an embodiment of the present disclosure. Referring to FIG. 4, the input direct current limitation part 142 may include: a PI controller 1421 configured to perform error removal control for converging an error between a preset input direct current limitation value (Idc_Lmt) and an input direct current average value (Idc_AVG) on zero; and a limiter 1422 configured to limit the output of the PI controller 1421 such that only negative values are output.

The output alternating current limitation part 141 may be configured to limit the rms value of output alternating current such that an rms value less than a limitation value is output. However, the output alternating current limitation part 141 is incapable of responding to the situation in which the direct current input from the battery 30 to the device is output with a value equal to or greater than the limitation value. Therefore, the input direct current limitation part 142 may be provided to limit the output of input direct current when input direct current, which has a value equal to or greater than a limitation value predetermined in consideration of hardware conditions, is output.

An embodiment of the present disclosure may include a divider (D) and a minimum value output unit (Min) to set an input direct current limitation value. The divider (D) may be configured to divide a preset maximum battery output (Po_Max) by an input direct current average value provided from the battery 30, and the minimum value output unit (Min) may output the smaller value among a preset input direct current limitation value (Idc_Lmt_Hw) and a value input from the divider as the input direct current limitation value (Idc_Lmt) in consideration of hardware characteristics.

The controller 1421 may be configured to perform control for converging an error on zero. In response to determining that an input direct current average value (Idc_AVG) is greater than the input direct current limitation value (Idc_Lmt), an error input to the controller 1421 may have a negative value, and the controller 1421 may be configured to output a second d-axis current upper-limit correction value (Iac_d_cor2) which has a negative value for converging the corresponding error on zero. When the second d-axis current upper-limit correction value (Iac_d_cor2) output by the controller 1421 is added to a d-axis component (Iac_d_Lmt) of a preset output alternating current limitation value, the upper-limit value of a current command output by the voltage controller 110 is reduced.

The limiter 1422 may be configured to limit an output such that only a negative value is output. In other words, the limiter 1422 may allow the second d-axis current upper-limit correction value (Iac_d_cor2), output by the input direct current limitation part 142, to be only a negative value. The limiter 1422 may allow, only when a value output by the controller 1421 is a negative value, the value output by the controller 1421 to be added to the d-axis component (Iac_d_Lmt) of the preset output alternating current limitation value, and thus may preventing the upper limit of a current command value, output by the voltage controller 110, from being increased and may reduce the current command value.

As described above, the upper limit of a d-axis current command output by the voltage controller 110 may be limited by an output current command upper-limit value (I_d_ref_max) to which the first d-axis current upper-limit correction value (Iac_d_cor1) and the second d-axis current upper-limit correction value (Iac_d_cor2), generated by the output alternating current limitation part 141 and the input direct current limitation part 142, have been applied. If there is no limitation situation, that is, if the output of each of the output alternating current limitation part 141 and the input direct current limitation part 142 has a value of zero, the upper limit of a d-axis current command output by the voltage controller 110 may correspond to a value obtained by multiplying the rms value (Iac_rms_Lmt) of the preset output alternating current limitation value by $\sqrt{2}$.

When the output alternating current from the device is excessive and thus is required to be limited, or when the input direct current has a value greater than a reference value preset in consideration of hardware conditions of the device and thus is required to be limited, the output alternating current limitation part 141 or the input direct current limitation part 142 outputs a negative value, and thus the upper-limit value of the current command output by the voltage controller 110 is gradually reduced.

In this situation, a d-axis component (I_d) of the output alternating current sensing value has a value greater than an output current command upper-limit value (I_d_ref_max) which is reduced, and an error value input to the current controller 120 is a negative value. Therefore, the current controller 120 may be configured to change and output a duty value to reduce current. As a result, when output alternating current or input direct current is excessive and thus the limitation situation is continuously maintained, the duty value may be continuously reduced, and thus a d-axis component (V_d) of an output alternating current voltage may also be continuously reduced.

The comparator 150 may be configured to compare, in the limitation situation, the d-axis component value (V_d) of the output alternating current voltage with a d-axis component lower-limit setting value (V_d_Lower_Lmt) of a preset output alternating current voltage. When the d-axis component value (V_d) of the output alternating current voltage is equal to or less than the preset d-axis component lower-limit setting value (V_d_Lower_Lmt) of the output alternating current voltage, the limitation situation is continuously maintained rather than being released, and it may thus be considered that the situation is dangerous. Therefore, the comparator 150 may shut down operation of the device to prevent power from being supplied from the battery 30 in the vehicle to the outside of the vehicle.

The rate (slope) at which the d-axis component value (V_d) of the output alternating current voltage is reduced may vary depending on the characteristics of a load. For example, in the case of a constant-current load, a load current is constant regardless of an output alternating current voltage value, but in the case of a constant-resistance load, resistance is constant, and thus, according to Ohm's law, if the magnitude of output alternating current voltage is reduced, a load current will also be reduced. Therefore, when compared with the case of the constant-current load, in the case of the constant-resistance load, a current controller input error is small, and thus the output alternating current voltage may be more slowly reduced. On the contrary, in the case of a constant-power load, the magnitude of power, which is a product of voltage and current, is constant, and thus, if an output alternating current voltage is reduced, a load current will be increased. Therefore, in the case of the constant-power load, a current controller input error is substantial, and thus the output alternating current voltage may be more rapidly reduced through control.

As described above, the output characteristics of the device for supplying power from a battery in a vehicle to the outside of the vehicle may be determined only by load characteristics. Therefore, there is a need to perform appropriate limitation operations with respect to various types of loads.

FIGS. 5 to 9 are waveform charts, each of which illustrates the result of simulation of operation of a device for supplying power from a battery in a vehicle to the outside of the vehicle according to various embodiments of the present disclosure. In FIGS. 5 to 9, the horizontal axis indicates time, and the vertical axis indicates a physical value of each parameter.

Figure 5:
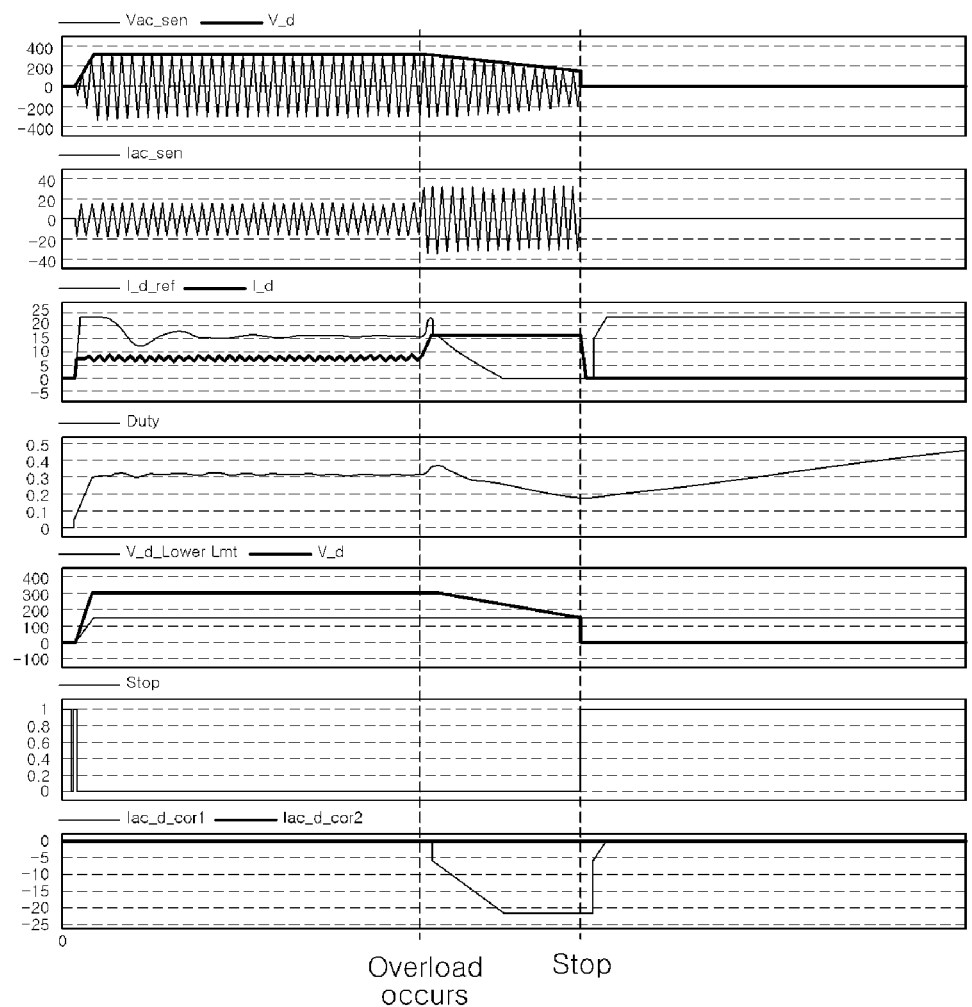
FIGS. 5 to 9 are waveform charts, each of which illustrates the result of simulation of operation of a device for supplying power from a battery in a vehicle to the outside of the vehicle according to various embodiments of the present disclosure.

FIG. 5 is a waveform chart illustrating operation in the case of a constant-current overload. As illustrated in FIG. 5, it may be determined that, when an overload occurs, a current command (I_d_ref), which is an output of the voltage controller 110 is reduced by a first d-axis current upper-limit correction value (Iac_d_cor1) which is generated by the output alternating current limitation part 141. Further, it may be determined that since a load is a constant-current load, a sensing value (Iac_sen) of an output alternating current and a d-axis value (I_d) thereof remain constant. In addition, it may be determined that a duty value output by the current controller 120 is reduced by adjustment of limiting output, and a d-axis value (V_d) of an output alternating current voltage is reduced accordingly. Further, it may be determined that, when the d-axis value (V_d) of the output alternating current voltage is equal to or less than a preset d-axis voltage lower-limit setting value (V_d_Lower Lmt) of the output alternating current voltage, operation of the device is stopped.

Figure 6:
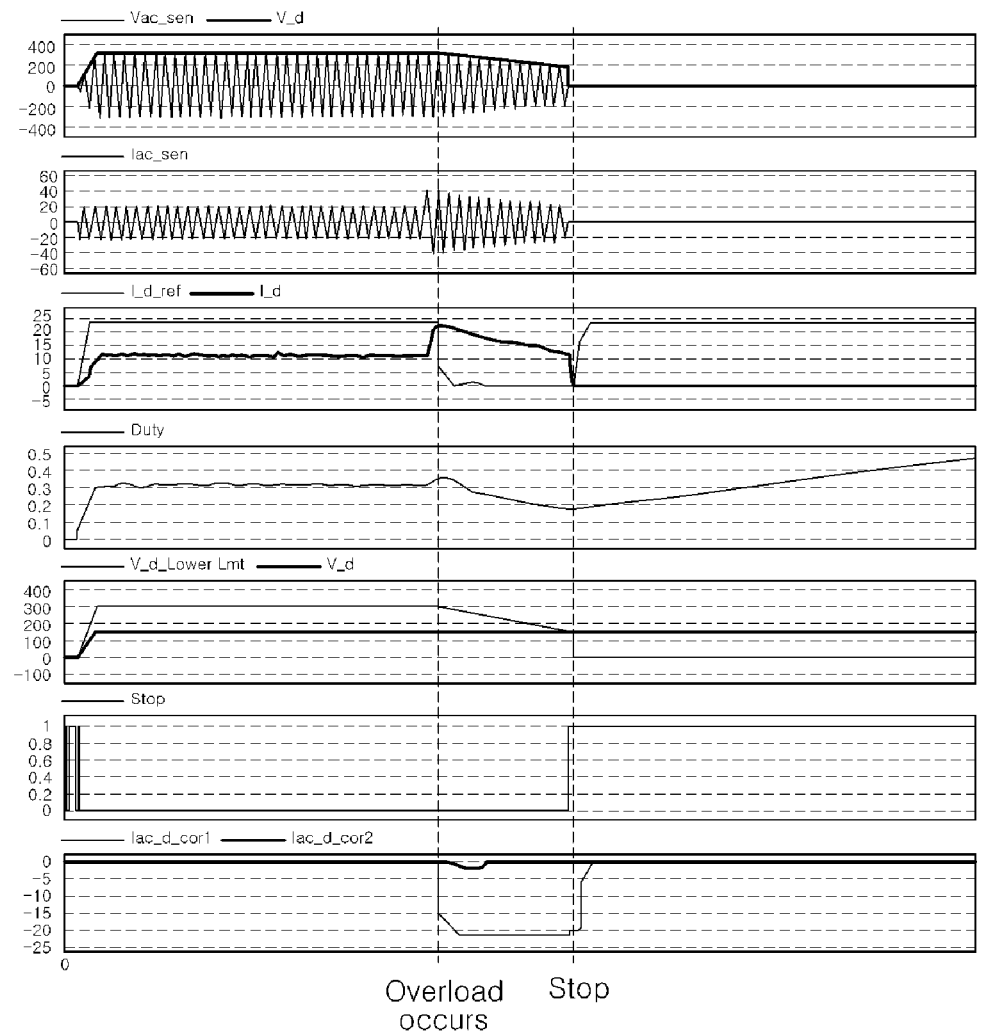

FIG. 6 is a waveform chart illustrating operation in the case of a constant-resistance overload. As illustrated FIG. 6, it may be determined that, when an overload occurs, a current command (I_d_ref), which is an output of the voltage controller 110 is reduced by a first d-axis current upper-limit correction value (Iac_d_cor1), which is generated by the output alternating current limitation part 141. Further, it may be determined that since a load is a constant-resistance load, a sensing value (Iac_sen) of an output alternating current and a d-axis value (I_d) thereof are gradually reduced. In addition, it may be determined that a duty value output by the current controller 120 is reduced by adjustment of limiting output, and a d-axis value (V_d) of an output alternating current voltage is reduced accordingly. Further, it may be determined that, when the d-axis value (V_d) of the output alternating current voltage is equal to or less than a preset d-axis voltage lower-limit setting value (V_d_Lower Lmt) of the output alternating current voltage, operation of the device is stopped.

Figure 7:
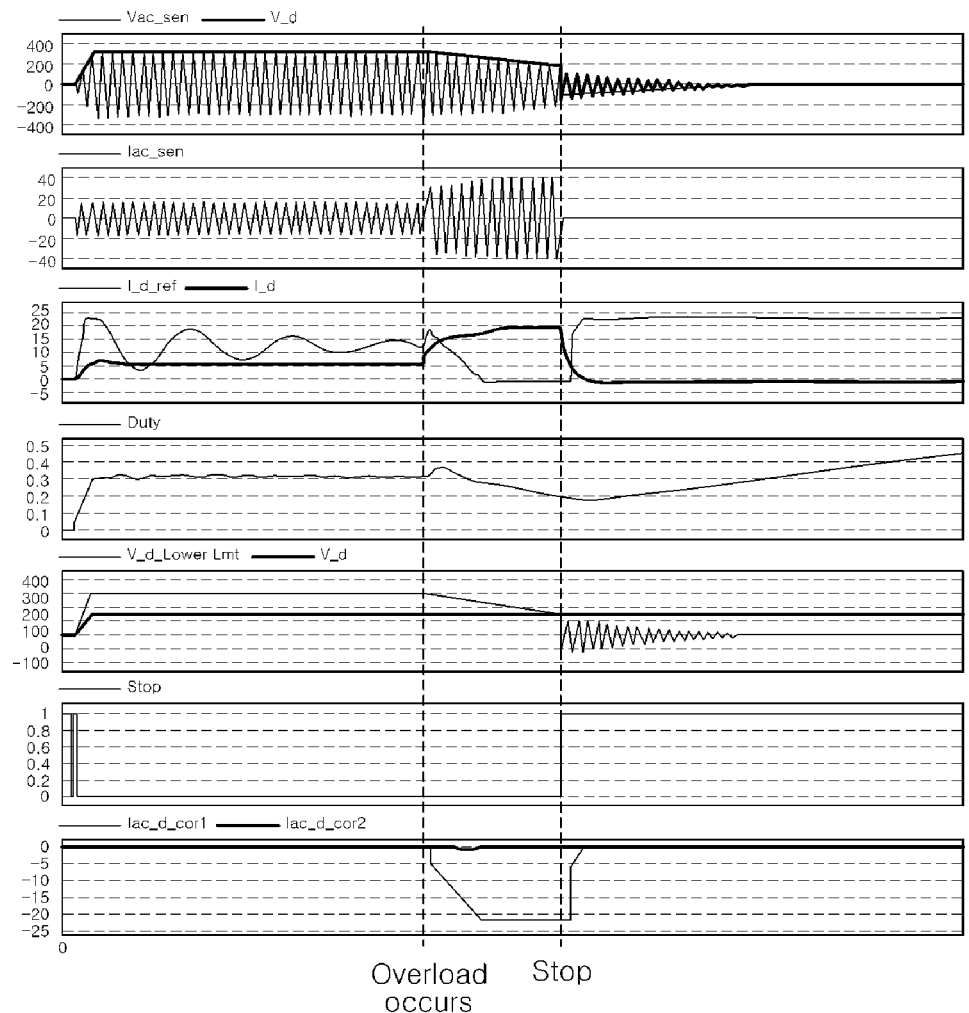

FIG. 7 is a waveform chart illustrating operation in the case of a constant-power overload. As illustrated in FIG. 7, it may be determined that, when an overload occurs, a current command (I_d_ref), which is an output of the voltage controller 110 is reduced by a first d-axis current upper-limit correction value (Iac_d_cor1), which is generated by the output alternating current limitation part 141. In addition, it may be determined that a duty value output by the current controller 120 is reduced by adjustment of limiting output and a d-axis value (V_d) of an output alternating current voltage is reduced accordingly.

Further, it may be determined that since a load is a constant-power load, if the magnitude of an output alternating current voltage is reduced, a sensing value (Iac_sen) of an output alternating current and a d-axis value (I_d) thereof are gradually increased. Further, it may be determined that, when the d-axis value (V_d) of the output alternating current voltage is equal to or less than a preset d-axis component lower-limit setting value (V_d_Lower Lmt) of the output alternating current voltage, operation of the device is stopped.

Figure 8:
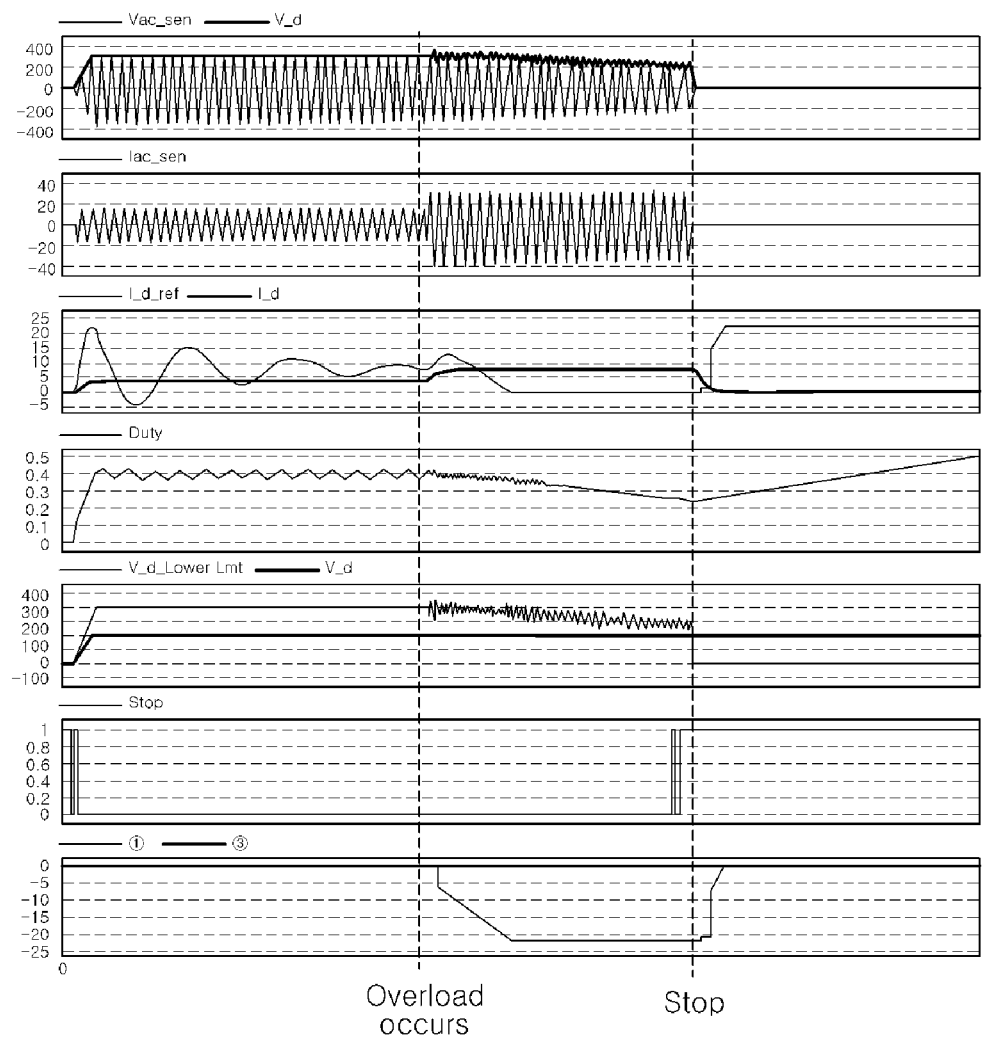

FIG. 8 is a waveform chart illustrating operation in the case of a capacitive constant-current overload. As illustrated in FIG. 8, it may be determined that, when an overload occurs, a current command (I_d_ref), which is the output of the voltage controller 110, is reduced by a first d-axis current upper-limit correction value (Iac_d_cor1) which is generated by the output alternating current limitation part 141. Further, it may be determined that since a load is a constant-current load, a sensing value (Iac_sen) of an output alternating current and a d-axis value (I_d) thereof remain constant. In addition, it may be determined that a duty value output by the current controller 120 is reduced by adjustment of limiting output and a d-axis value (V_d) of an output alternating current voltage is reduced accordingly. Further, it may be determined that, when the d-axis value (V_d) of the output alternating current voltage is equal to or less than a preset d-axis component lower-limit setting value (V_d_Lower Lmt) of the output alternating current voltage, operation of the device is stopped.

Figure 9:
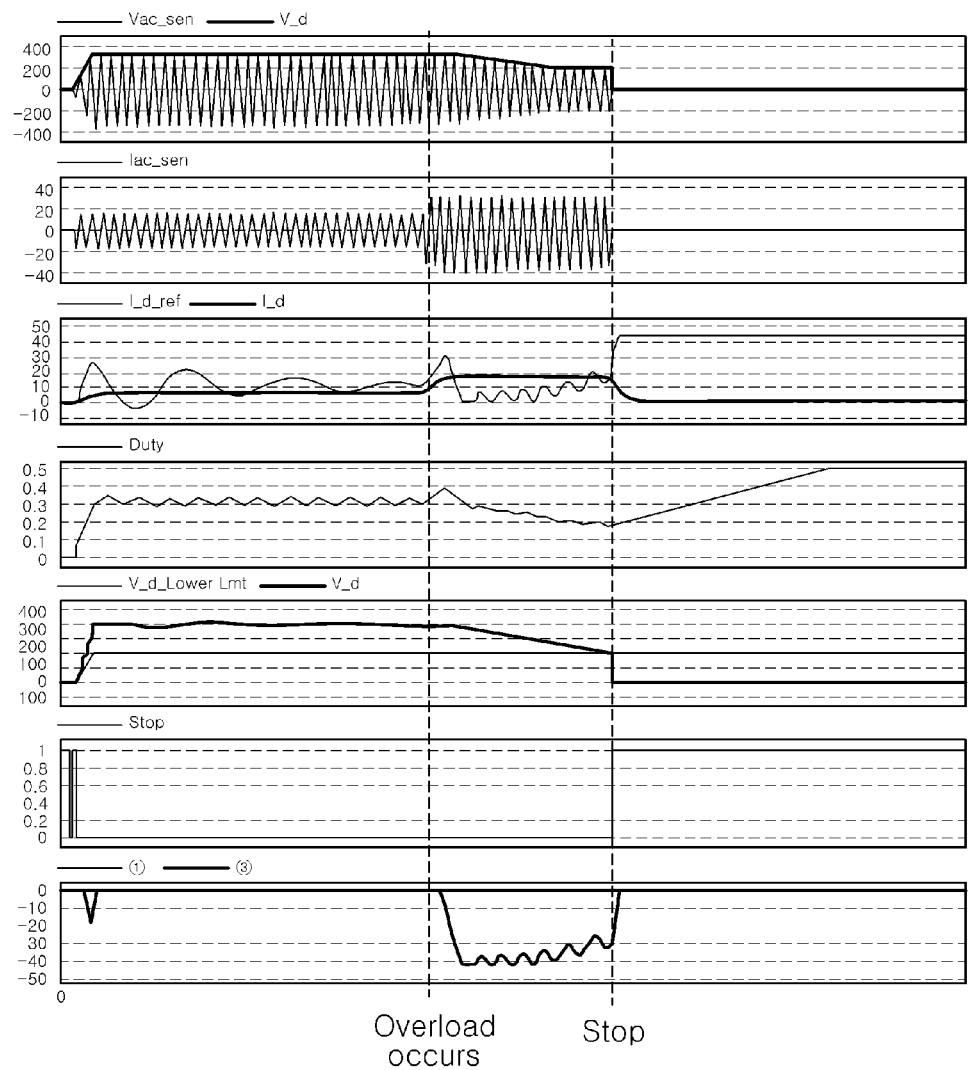

FIG. 9 is a waveform chart illustrating an operation of limiting an input direct current when an overload occurs. As illustrated in FIG. 9, it may be determined that, when an input direct current is limited, a current command (I_d_ref), which is the output of the voltage controller 110 is reduced by a second d-axis current upper-limit correction value (Iac_d_cor2) which is generated by the input direct current limitation part 142, and thus a duty value output by the current controller 120.

Further, it may be determined that a d-axis value (V_d) of an output alternating current voltage is reduced by the reduction of the duty value. In addition, it may be determined that since a load is a constant-current load, a sensing value (Iac_sen) of an output alternating current and a d-axis value (I_d) thereof remain constant. Further, it may be determined that, when the d-axis value (V_d) of the output alternating current voltage is equal to or less than a preset d-axis component lower-limit setting value (V_d_Lower Lmt) of the output alternating current voltage, operation of the device is stopped.

As described above, the device for supplying power from a battery in a vehicle to the outside of the vehicle according to various embodiments of the present disclosure may perform an operation of: in a temporary overload situation or the like, maintaining power supply while gradually reducing the magnitude of an output alternating current voltage, rather than immediately stopping power supply; and then stopping the power supply when the reduced magnitude of the output alternating current voltage is finally equal to or less than a preset reference. Through this operation, the device for supplying power from a battery in a vehicle to the outside of the vehicle according to various embodiments of the present disclosure may stop power supply when a temporary overload situation occurs due to a disturbance or the like, thereby preventing a user from being inconvenienced. In addition, the device for supplying power from a battery in a vehicle to the outside of the vehicle according to various embodiments of the present disclosure enables stable overload protection regardless of the types of loads which is supplied with power from the battery of the vehicle.

Hereinbefore, although the present disclosure has been described and illustrated with reference to particular embodiments thereof, it will be apparent to a person skilled in the art that various improvements and modifications of the present disclosure can be made without departing from the following claims.

What is claimed is:

1. A device configured to supply power from a battery in a vehicle to an outside of the vehicle, wherein the device receives direct current power from the battery in the vehicle, converts the direct current power into alternating current power, and outputs the alternating current power to a load outside the vehicle, the device comprising:
   an inverter circuit including a bridge circuit having multiple switching elements, wherein the inverter circuit is configured to convert the received direct current power into the alternating current power by switching of the switching elements, and output the alternating current power; and
   a controller configured to control an on/off state of each of the switching elements through pulse width modulation,
   wherein the controller is further configured to:
   in response to determining that an output alternating current output to the load has a value greater than a preset first reference value or an input direct current input into the inverter circuit has a value greater than a preset second reference value, change a duty of each of the switching elements to reduce an output alternating current voltage output from the inverter circuit; and
   in response to determining that the reduced output alternating current voltage has a value equal to or less than a preset third reference value, stop a power conversion operation of the inverter circuit, and
   wherein the controller includes:
   a voltage controller configured to generate a d-axis current command value for converging an error between a d-axis voltage value of an output alternating current voltage output from the inverter circuit to the load and a preset d-axis voltage command value on zero;
   a current controller configured to determine a duty of each of the switching elements to converge an error between a d-axis current value of the output alternating current output from the inverter circuit to the load and the d-axis current command value on zero; and
   a current upper-limit value setting part configured to set an upper limit of the d-axis current command value such that the upper limit of d-axis current command value is reduced when the output alternating current has a value greater than the preset first reference value or when the input direct current has a value greater than the preset second reference value.

2. The device of claim 1, wherein the controller further includes a comparator configured to output a command to stop a power conversion operation of the inverter circuit in response to determining that the d-axis voltage value of the output alternating current voltage is equal to or less than a preset d-axis voltage lower-limit setting value regarding an output alternating current voltage.

3. The device of claim 1, wherein the current upper-limit value setting part includes an output alternating current limitation part configured to generate a first d-axis current upper-limit correction value for converging an error between a limitation value regarding a preset rms value of an output alternating current and a sensing value of the output alternating current on zero, and is configured to determine the upper limit of the d-axis current command value by adding the first d-axis current upper-limit correction value to a d-axis current limitation value derived from the limitation value regarding the preset rms value of the output alternating current.

4. The device of claim 3, wherein the d-axis current limitation value is determined by multiplying the preset rms value of the output alternating current by $\sqrt{2}$.

5. The device of claim 3, wherein the output alternating current limitation part includes a limiter configured to limit the first d-axis current upper-limit correction value to add the first d-axis current upper-limit correction value to the d-axis current limitation value when the first d-axis current upper-limit correction value is zero or a negative number.

6. The device of claim 1, wherein the current upper-limit value setting part includes an input direct current limitation part configured to generate a second d-axis current upper-limit correction value for converging an error between a preset input direct current limitation value and an average value of a sensing value of an input direct current input from the battery to the inverter circuit on zero, and is configured to determine the upper limit of the d-axis current command value by adding the second d-axis current upper-limit correction value to a d-axis current limitation value derived from the limitation value regarding the preset rms value of the output alternating current.

7. The device of claim 5, wherein the d-axis current limitation value is determined by multiplying the preset rms value of the output alternating current by $\sqrt{2}$.

8. The device of claim 5, wherein the current upper-limit value setting part is configured to:
   divide a preset maximum output of the battery by an average value of the input direct current voltage; and
   set, to the input direct current limitation value, a smaller value selected from among an input direct current limitation value preset in consideration of a hardware characteristic and a value resulting from the division.

9. The device of claim 6, wherein the input direct current limitation part includes a limiter configured to limit the second d-axis current upper-limit correction value to add the second d-axis current upper-limit correction value to the d-axis current limitation value when the second d-axis current upper-limit correction value is zero or a negative number.

10. A bidirectional charger for a vehicle, which, in a charging mode of a battery in the vehicle, receives alternating current power from outside the vehicle, converts the alternating current power into direct current power, and provides the direct current power as charging power for the battery, and, in a load power provision mode, receives direct current power from the battery, converts the direct current power into alternating current power, and outputs the alternating current power to a load outside the vehicle, the bidirectional charger comprising:
   an inverter-type power-factor correction circuit including a bridge circuit having multiple switching elements and is configured to, through switching of the switching elements, convert external alternating current power into direct current power in the charging mode and convert direct current power into alternating current power in the load power provision mode;

a bidirectional direct current converter configured to convert a voltage of the direct current power converted by the inverter-type power-factor correction circuit in the charging mode into a charging voltage for the battery, and in the load power provision mode, convert a voltage of the battery and provide the converted voltage of the battery to the inverter-type power-factor correction circuit; and a controller configured to control an on/off state of each of the switching elements through pulse width modulation, wherein the controller is configured to:

change, in the load power provision mode, a duty of each of the switching elements to reduce an output alternating current voltage output from the inverter-type power-factor correction circuit in response to determining that an output alternating current output to the load has a value greater than a preset first reference value or in response to determining that an input direct current input into the inverter-type power-factor correction circuit has a value greater than a preset second reference value; and stop the load power provision mode in response to determining that the reduced output alternating current voltage has a value equal to or less than a preset third reference value, and wherein the controller includes:

a voltage controller configured to generate a d-axis current command value for converging an error between a d-axis voltage value of an output alternating current voltage output from the inverter-type power-factor correction circuit to the load and a preset d-axis voltage command value on zero in the load power provision mode;

a current controller configured to determine a duty of each of the switching elements to converge an error between a d-axis current value of the output alternating current output from the inverter-type power-factor correction circuit to the load and the d-axis current command value on zero in the load power provision mode; and a current upper-limit value setting part configured to set an upper limit of the d-axis current command value to reduce the upper limit of the d-axis current command value in response to determining that the output alternating current has a value greater than the preset reference value or that the input direct current has a value greater than the preset reference value in the load power provision mode.

11. The bidirectional charger of claim 10, wherein the controller further includes a comparator configured to output a command to stop a power conversion operation of the inverter-type power-factor correction circuit when the d-axis voltage value of the output alternating current voltage is equal to or less than a preset d-axis voltage lower-limit setting value regarding an output alternating current voltage in the load power provision mode.

12. The bidirectional charger of claim 10, wherein the current upper-limit value setting part includes an output alternating current limitation part configured to generate a first d-axis current upper-limit correction value for converging an error between a limitation value regarding a preset rms value of an output alternating current and a sensing value of the output alternating current on zero in the load power provision mode, and is configured to determine the upper limit of the d-axis current command value by adding the first d-axis current upper-limit correction value to a d-axis current limitation value derived from the limitation value regarding the preset rms value of the output alternating current in the load power provision mode.

13. The bidirectional charger of claim 12, wherein the d-axis current limitation value is determined by multiplying the preset rms value of the output alternating current by $\sqrt{2}$.

14. The bidirectional charger of claim 12, wherein the output alternating current limitation part includes a limiter configured to limit the first d-axis current upper-limit correction value to add the first d-axis current upper-limit correction value to the d-axis current limitation value when the first d-axis current upper-limit correction value is zero or a negative number in the load power provision mode.

15. The bidirectional charger of claim 10, wherein the current upper-limit value setting part includes an input direct current limitation part configured to generate a second d-axis current upper-limit correction value for converging an error between a preset input direct current limitation value and an average value of a sensing value of an input direct current input from the battery to the inverter-type power-factor correction circuit on zero in the load power provision mode, and is configured to determine the upper limit of the d-axis current command value by adding the second d-axis current upper-limit correction value to a d-axis current limitation value derived from the limitation value regarding the preset rms value of the output alternating current in the load power provision mode.

16. The bidirectional charger of claim 14, wherein the d-axis current limitation value is determined by multiplying the preset rms value of the output alternating current by $\sqrt{2}$.

17. The bidirectional charger of claim 14, wherein the current upper-limit value setting part is configured to: divide a preset maximum output of the battery by an average value of the input direct current voltage in the load power provision mode; and set, to the input direct current limitation value, a smaller value selected from among an input direct current limitation value preset in consideration of a hardware characteristic and a value resulting from the division.

18. The bidirectional charger of claim 15, wherein the input direct current limitation part includes a limiter configured to limit the second d-axis current upper-limit correction value such that the second d-axis current upper-limit correction value is added to the d-axis current limitation value when the second d-axis current upper-limit correction value is zero or a negative number in the load power provision mode.

* * * * *